United States Patent
Balmakhtar (10) Patent No.: US 11,809,924 B2
(45) Date of Patent: *Nov. 7, 2023

(54) WIRELESS COMMUNICATION SERVICE OVER A NETWORK EXPOSURE FUNCTION (NEF) THAT HAS AN APPLICATION PROGRAMMING INTERFACE (API)

(71) Applicant: T-Mobile Innovations LLC, Overland Park, KS (US)

(72) Inventor: Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/398,674

(22) Filed: Aug. 10, 2021

(65) Prior Publication Data

US 2023/0051308 A1    Feb. 16, 2023

(51) Int. Cl.
*G06F 9/54* (2006.01)
*H04W 4/50* (2018.01)

(52) U.S. Cl.
CPC .............. *G06F 9/547* (2013.01); *H04W 4/50* (2018.02)

(58) Field of Classification Search
CPC ................................ H04W 4/50; G06F 9/547
See application file for complete search history.

(56) References Cited

U.S. PATENT DOCUMENTS

| | | | |
|---|---|---|---|
| 10,791,508 B2 | 9/2020 | Park et al. | |
| 10,856,265 B2 | 12/2020 | Ryu | |
| 10,952,176 B2 | 3/2021 | Bharatia | |
| 2018/0192471 A1* | 7/2018 | Li | H04W 4/50 |
| 2019/0020549 A1* | 1/2019 | Kim | H04L 41/344 |
| 2019/0274189 A1 | 9/2019 | Jain et al. | |
| 2020/0053638 A1* | 2/2020 | Edge | H04W 4/029 |
| 2020/0068047 A1* | 2/2020 | Huang | H04L 67/141 |
| 2020/0252813 A1 | 8/2020 | Li et al. | |
| 2021/0058851 A1* | 2/2021 | Hua | H04W 8/08 |
| 2021/0274392 A1* | 9/2021 | Dao | H04W 36/18 |
| 2022/0225223 A1* | 7/2022 | Huang | H04W 40/248 |
| 2022/0377514 A1* | 11/2022 | Balmakhtar | H04W 36/0022 |
| 2023/0113108 A1* | 4/2023 | Tao | H04W 12/06 |
| | | | 455/418 |

FOREIGN PATENT DOCUMENTS

| | | |
|---|---|---|
| WO | 2019001376 A1 | 1/2019 |
| WO | 2020238411 A1 | 12/2020 |
| WO | 2021037386 A1 | 3/2021 |

* cited by examiner

*Primary Examiner* — Jeong S Park (57) ABSTRACT

A wireless communication network to serve a User Equipment (UE) over Network Exposure Functions (NEFs) that have Application Programming Interfaces (APIs). In the wireless communication network, a NEF Interface Function (NIF) receives a NEF request from a network function. The NIF correlates the NEF request with one of the APIs. The NIF selects one of the NEFs based on the one of the APIs. The NIF translates the NEF request into an API call based on the one of the APIs. The NIF transfers the API call to the one of the NEFs. The one of the NEFs receive the API call and responsively performs a network task for the UE based on the API call.

20 Claims, 10 Drawing Sheets

WIRELESS COMMUNICATION SERVICE OVER A NETWORK EXPOSURE FUNCTION (NEF) THAT HAS AN APPLICATION PROGRAMMING INTERFACE (API)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Interworking Functions (IWFs), Access and Mobility Management Functions (AMFs), Session Management Functions (SMFs), User Plane Functions (UPFs), Network Exposure Functions (NEFs), Application Functions (AFs), and the like.

The NEFs communicate with the other network elements to expose events and implement network capabilities. The NEFs and the AFs have an Application Programming Interfaces (API) to control the exposure of the events and the implementation of the network capabilities. The AFs are linked to external Application Servers (AS) that subscribe to the events and capabilities. The AS is often operated by a large operator that uses the AF and NEF to control services for a multitude of their affiliated wireless user devices. The NEF API calls from the AF allow the external AS to perform UE monitoring, device triggering, background data transfer, parameter provisioning, packet flow description management, traffic influence, chargeable party control, and NEF session quality.

The wireless user devices execute user applications that consume wireless data services. The wireless communication networks serve the wireless user devices over wireless network slices. The wireless network slices comprise slice-optimized network elements like UPFs. For example, a wireless user device that executes a user application which requires ultra-low latency would use a wireless network slice that comprises network elements which are optimized for ultra-low latency. Another wireless user device that executes a user application that requires massive video bandwidth would use a network slice that comprises network elements which are nixed for massive download speed.

Unfortunately, the wireless user devices and the AFs do not effectively interact with NEFs. Moreover, the wireless user devices and the AS do not efficiently communicate with NEFs over wireless network slices.

TECHNICAL OVERVIEW

A wireless communication network serves a User Equipment (UE) over Network Exposure Functions (NEFs) that have Application Programming Interfaces (APIs). In the wireless communication network, a NEF Interface Function (NIF) receives a NEF request from a network function. The NIF correlates the NEF request with one of the APIs. The NIF selects one of the NEFs based on the one of the APIs. The NIF translates the NEF request into an API call based on the one of the APIs. The NIF transfers the API call to the one of the NEFs. The one of the NEFs receive the API call and responsively performs a network task for the UE based on the API call.

DETAILED DESCRIPTION

Figure 1:
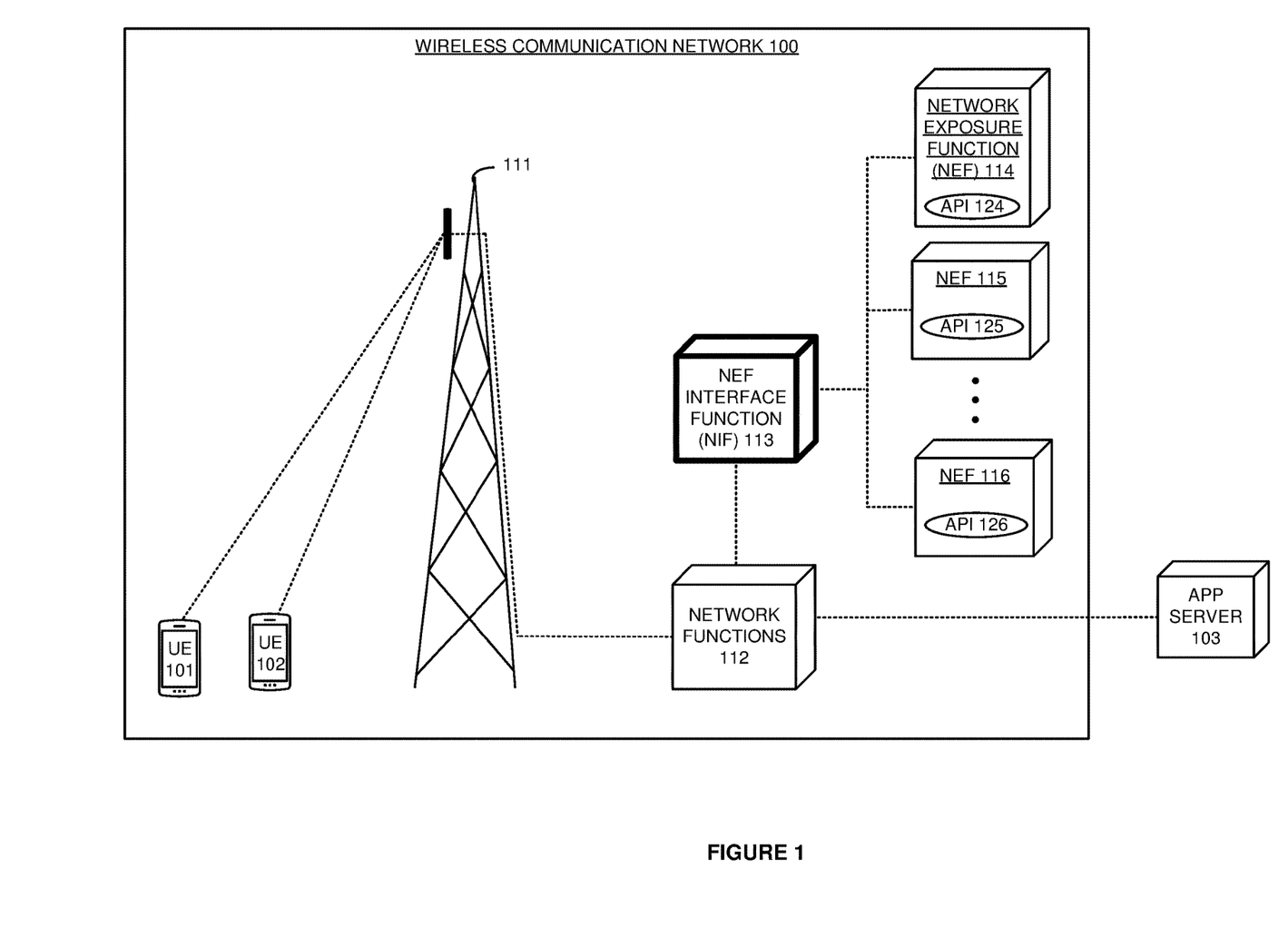
FIG. 1 illustrates a wireless communication network that serves a User Equipment (UEs) over Network Exposure Functions (NEFs) that have Application Programming Interfaces (APIs).

FIG. 1 illustrates wireless communication network 100 that serves User Equipment (UEs) 101-102 over Network Exposure Functions (NEFs) 114-116 that have Application Programming Interfaces (APIs) 124-126. Wireless communication network 100 comprises UEs 101-102, application server 103, access node 111, network functions 112, NEF Interface Function (NIF) 113, and NEFs 114-116. UEs 101-102 comprises a computer, phone, vehicle, sensor, robot, or some other data appliance with data communication circuitry. Exemplary wireless data services include machine-control, internet-access, media-streaming, social-networking, or some other networking product. Wireless communication network 100 is simplified and typically includes more UEs, access nodes, NEFs, and application servers than shown.

Various examples of network operation and configuration are described herein. In some examples, NIF 113 receives a NEF request from network functions 112 that is related to UE 101. NIF 113 correlates the NEF request with one of APIs 124-126. NIF 113 selects one of NEFs 124-126 based on the identified one of APIs 124-126. For example, NIF 113 may correlate a network slice with API 125 and then select NEF 115 because it uses API 125. NIF 113 translates the NEF request into an API call based on the identified one of APIs 124-126. NIF 113 transfers the API call to the selected one of NEFs 114-116. The selected one of NEFs 114-116 receives the API call and responsively performs a network task for UE 101 based on the API call. For example, NEF 114 may improve service quality for UE 101 responsive to a request from application server 103. In another example, NEF 114 may transfer slice data from UE 101 to application server 103.

In some examples, the selected one of NEFs 114-116 generates and transfers an API response to the API call to NIF 113. NIF 113 translates the API response into a NEF response based on the identified one of APIs 124-126. NIF 113 then transfers the API response to the requesting one of network functions 112, another one of network functions 112, UE 101, UE 102, or some other destination. In some examples, network functions 112 comprise one or more Application Functions (AFs) that receive UE data from UE 101 and responsively generate the NEF message for NIF 113. The AFs may receive UE data from an application server 103 and responsively generate the NEF message for NIF 113.

Advantageously, network functions 112 and UEs 101-102 effectively interact w NEFs 114-116. Moreover. UEs 101-102 and AS 103 efficiently communicate with NEFs 114-116 over wireless network slices.

UEs 101-102 communicate with access node 111 over wireless technologies like Fifth Generation New Radio (5GNR) Long Term Evolution (LTE), Institute of Electrical and Electronic Engineers (IEEE) 802.11 (WIFI), Low-Power Wide Area Network (LP-WAN), Bluetooth, or some other wireless communication protocol. In some examples, UEs 101-102 communicate with network functions 112 over other access nodes that use Ethernet, Time Division Multiplex (TDM), Data Over Cable System Interface Specification (DOCSIS), WIFI, Internet Protocol (IP), General Packet Radio Service Transfer Protocol (GTP), virtual switching, inter-processor communication, bus interfaces, and/or some other data communication protocols. The communication links in wireless communication network 100 are depicted by dotted lines and use metallic wiring, glass fibers, radio channels, or some other communication media. The communication links use 5GNR, LTE, WIFI, Ethernet, TDM, DOCSIS, WIFI, Internet Protocol IP, GTP, virtual switching, inter-processor communication, bus interfaces, and/or some other data communication protocols. UEs 101-102, application server 103, access node 111, and functions 112-116, comprise microprocessors, software, memories, transceivers, bus circuitry, and the like. UEs 101-102 and access node 111 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
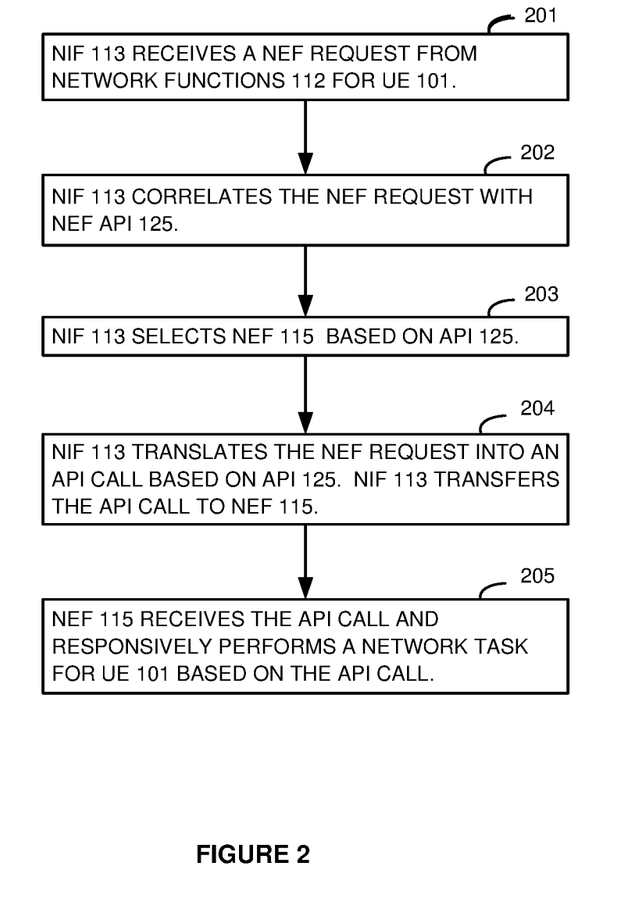
FIG. 2 illustrates an exemplary operation of the wireless communication network to serve the UE over the NEFs that have the APIs.

FIG. 2 illustrates an exemplary operation of wireless communication network 100 to serve UE 101 over the NEFs 114-116 that have APIs 124-126. The operation may differ in other examples. NIF 113 receives a NEF request from network functions 112 that is related to UE 101 (201). NIF 113 correlates the NEF request with API 125 (202). NIF 113 selects NEF 115 based on API 125 which is used by NEF 115 (203). NIF 113 translates the NEF request into an API call based on API 125 (204). NIF 113 transfers the API call to selected NEF 115 (204). NEF 115 receives the API call and responsively performs a network task for UE 101 based on the API call (205).

Figure 3:
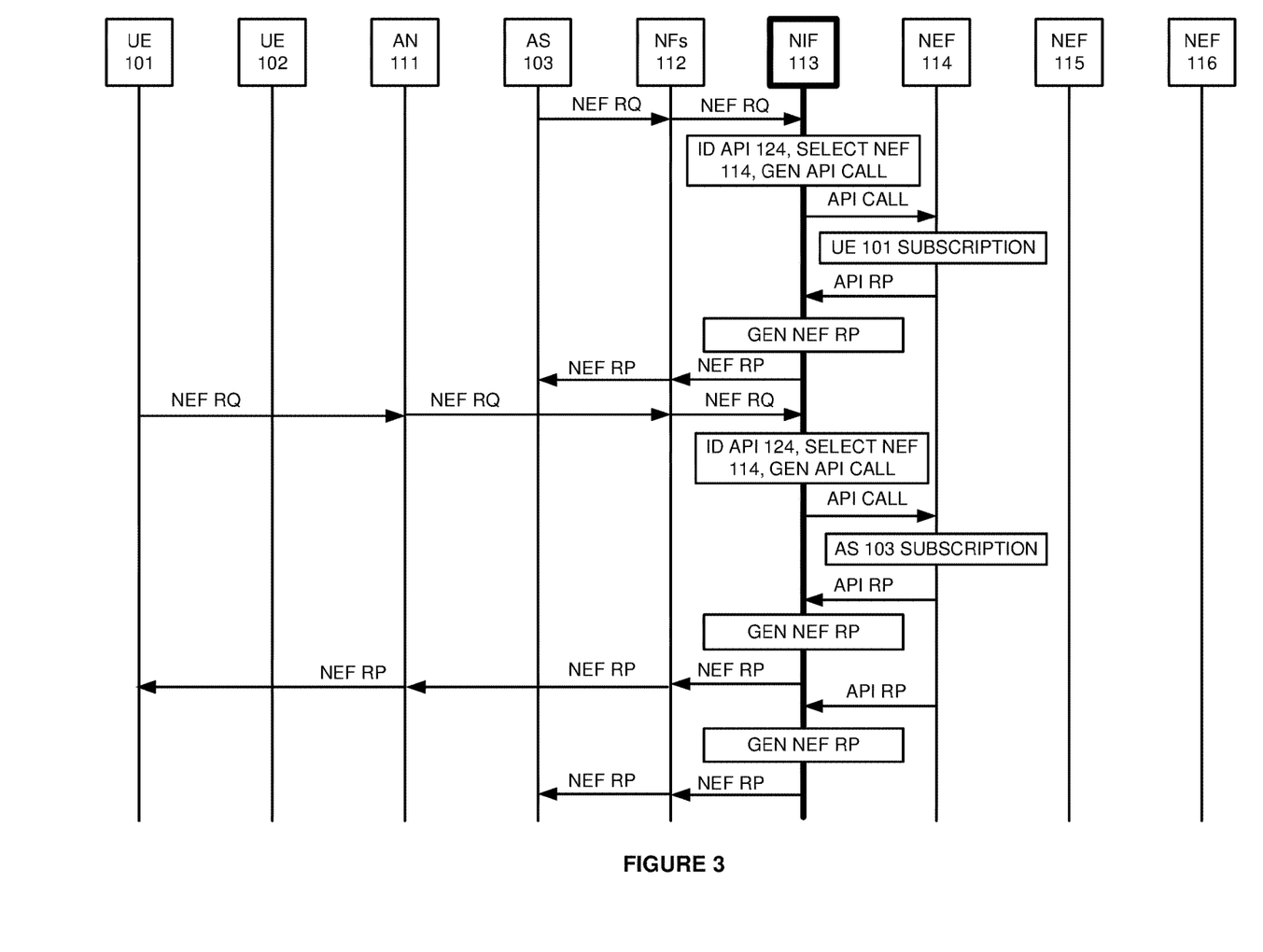
FIG. 3 illustrates an exemplary operation of the wireless communication network to serve the UE over the NEFs that have the APIs.

FIG. 3 illustrates an exemplary operation of wireless communication network 100 to serve UE 101 over NEFs 114-116 that have APIs 124-126. The operation may differ in other examples. App server (AS) 103 transfers a NEF request (RQ) for UE 101 data to an AF in network functions 112. The AF in network functions 112 forwards the NEF request to NIF 113. In some examples, AS 103 uses a network slice that comprises the AF to communicate with NIF 113. NIF 113 receives the NEF request for UE 101 from the AF in network functions 112. NIF 113 correlates the NEF request with API 124 based on the UE ID, slice ID, UE location, and/or some other information. NIF 113 selects NEF 114 because it uses identified API 124 and is nearest the UE location. NIF 113 translates the NEF request into an API call based on identified API 124. AS 103 and NIF 113 may use templates for the NEF requests, and NIF hosts data structures that translate between data in different sections of the templates and data in different sections of the APIs. NIF 113 transfers the API call to selected NEF 114. Selected NEF 114 receives the API call and responsively initiates a subscription for app server 103 to get UE data from UE 101. NEF 114 generates and transfers an API response (RP) to the API call to NIF 113. NIF 113 translates the API response into a NEF response using API 124. NIF 113 transfers the API response to app server 103 over the AF in network functions 112.

UE 101 transfers another NEF request with UE 101 data for app server 103. The other NEF request traverses access node 111 and an AF in network functions 112. The AF in network functions 112 forwards the other NEF request to NIF 113. In some examples, UE 101 uses a network slice that comprises the AF to communicate with NIF 113. NIF 113 receives the other NEF request and correlates the other NEF request with API 124 based on UE ID, slice ID, UE location, and the like. NIF IF 113 selects NEF 114 because it uses API 124 and is near UE 101. NIF 113 translates the NEF request into an API call based on API 124. NIF 113 transfers the API call to NEF 114. NEF 114 receives the API call and responsively serves the subscription from app server 103 for UE data from UE 101. NEF 114 generates and transfers a first API response to the API call to NIF 113—an ack for UE 101. NIF 113 translates the API response into a NEF response using API 124. NIF 113 transfers the API response (the ack to the NEF RQ) to UE 101 over the AF in network functions 112 and access node 111. NEF 114 also generates and transfers a second API response to the API call to NIF 113—the UE data for app server 103. NIF 113 translates the API response into a NEF response using API 124. NIF 113 transfers the API response (UE data) to app server 103 over the AF in network functions 112.

Figure 4:
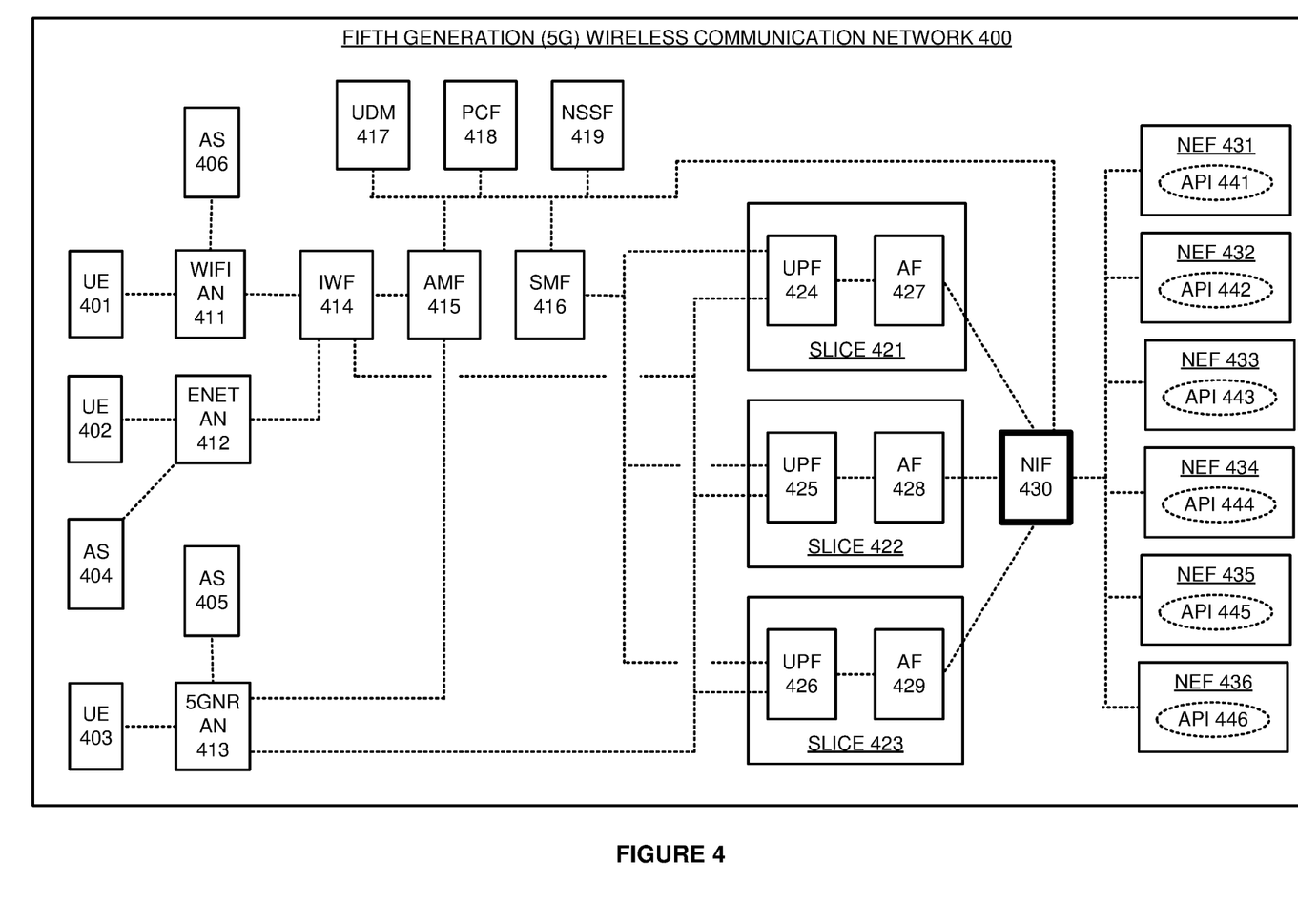
FIG. 4 illustrates an exemplary Fifth Generation (5G) wireless communication network to serve UEs over NEFs that have APIs.

FIG. 4 illustrates a Fifth Generation (5G) wireless communication network 400 to serve UEs 401-403 over NEFs 431-436 that have APIs 441-446. 5G wireless communication network 400 comprises an example of wireless communication network 100, although network 100 may differ. 5G wireless communication network 400 comprises: UEs 401-403, app servers (AS) 404-406, WIFI Access Node (AN) 411, Ethernet (ENET) AN 412, 5GNR AN 413, non-Third Generation Partnership Project Interworking Function (non-3GPP IWF) 414, Access and Mobility Management Function (AMF) 415, Session Management Function (SMF) 416, Unified Data Management (UDM) 417, Policy Control Function (PCF) 418, Network Slice Selection Function (NSSF) 419, wireless network slices 421-423, NEF Interface Function (NIF) 430, and NEFs 431-436. Wireless network slice 421 comprises User Plane Function (UPF) 424 and Application Function (AF) 427. Wireless network slice 422 comprises UPF 425 and AF 428. Wireless network slice 423 comprises UPF 426 and AF 429.

App Server (AS) 404 registers with AMF 415 over ENET AN 412 and IWF 414. AMF 415 and NSSF 419 authorize AS 404 for slice 422. AMF 415 directs IWF 414 and SMF 416 to manage sessions for AS 404 over slice 422. AS 403 transfers a NEF request to AF 428 in slice 422 over ENET AN 412, IWF 414, and UPF 425. The NEF request comprises a subscription to UE 403 data. Using a data structure, NIF 430 translates the ID for slice 422 into an ID for API 442 and translates the ID for API 442 into an ID for NEF 432. The location of UE 403 may be used to optimize NEF selection. NIF 430 converts the NEF request into an API call using API 442. The translation may entail data translation between specific data fields in a NEF request/response template and corresponding data fields in an API template for API 442. NIF 430 transfers the API call to selected NEF 432. NEF 432 process the API call using API 442 to log the AS 404 subscription for UE 403 data.

UE 403 registers with AMF 415 over 5GNR AN 413. AMF 415 and NSSF 419 authorize UE 403 for slice 422. AMF 415 directs AN 413 and SMF 416 to manage sessions for UE 403 over slice 422. UE 403 transfers a NEF request to AF 428 in slice 422 over 5GNR AN 413 and UPF 425. The NEF request comprises UE 403 data. Using a data structure, NIF 430 translates the ID for slice 422 into the ID for API 442 and translates the ID for API 442 into the ID for NEF 432. The location of UE 403 may be used to optimize NEF selection. NIF 430 converts the NEF request into an API call using API 442. NIF 430 transfers the API call to selected NEF 432.

NEF 432 process the API call using API 442 to serve the AS 404 subscription to UE 403 data. NEF 432 generates an API response for AS 404 using API 442 and transfers the API response to NIF 430. NIF 430 converts the API response into a NEF response using API 442. NIF transfers the NEF response to AS 404 over AF 428 and UPF in slice 422. AS 404 receives the UE 403 data per the subscription.

In a like manner, AS 405-406 communicate with select NEFs 431-436 over authorized slices 421-423 and NIF 430. UEs 401-402 also communicate with select NEFs 431-436 over authorized slices 421-423 and NIF 430. AS 404-406 may interact with NEFs 431-436 to order NEF services for UEs 401-403 like UE location and session quality-control. NEFs 431-436 and various network functions (AMF 415, SMF 416, UDM 417, and PCF 418) communicate to deliver the NEF services for UEs 401-403 like UE location and session quality-control.

Figure 5:
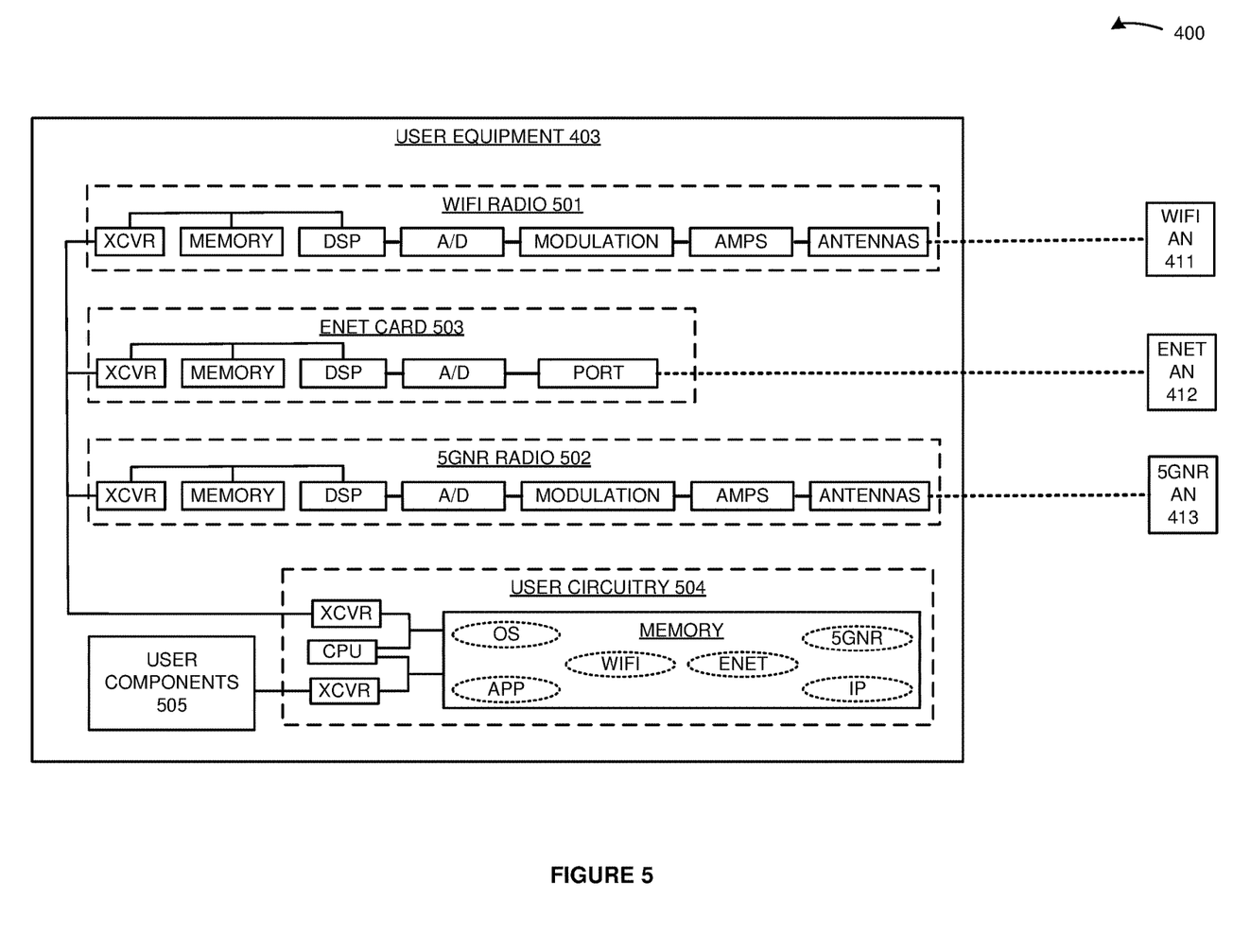
FIG. 5 illustrates an exemplary UE in the 5G wireless communication network.

FIG. 5 illustrates UE 403 in 5G wireless communication network 400. UE 403 comprises an example of UEs 101-102 and 401-402, although UEs 101-102 and 401-402 may differ. UE 403 comprises WIFI radio 501, 5GNR radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. Ethernet card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, user applications (APP), and network applications for WIFI, ENET, 5GNR, and IP. The network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in WIFI radio 501 are wirelessly coupled to WIFI AN 411 over a WIFI link. The antennas in 5GNR radio 502 are wirelessly coupled to 5GNR AN 413 over a 5GNR link. The port in ENET card 503 is wireline coupled to ENET AN 412 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with: WIFI AN 411 over WIFI radio 501, ENET AN 412 over ENET card 503, and 5GNR AN 413 over 5GNR radio 502. In some examples, some of the WIFI, ENET, and 5GNR components could be omitted. For example, the 5GNR and ENET portions could be omitted to form a WIFI-only device. The 5GNR and WIFI portions could be omitted to form an ENET-only device. The WIFI and ENET portions could be omitted to form a 5GNR-only device. Other device combinations could be used like 5GNR/WIFI, 5GNR/ENET, and WIFI/ENET.

Figure 6:
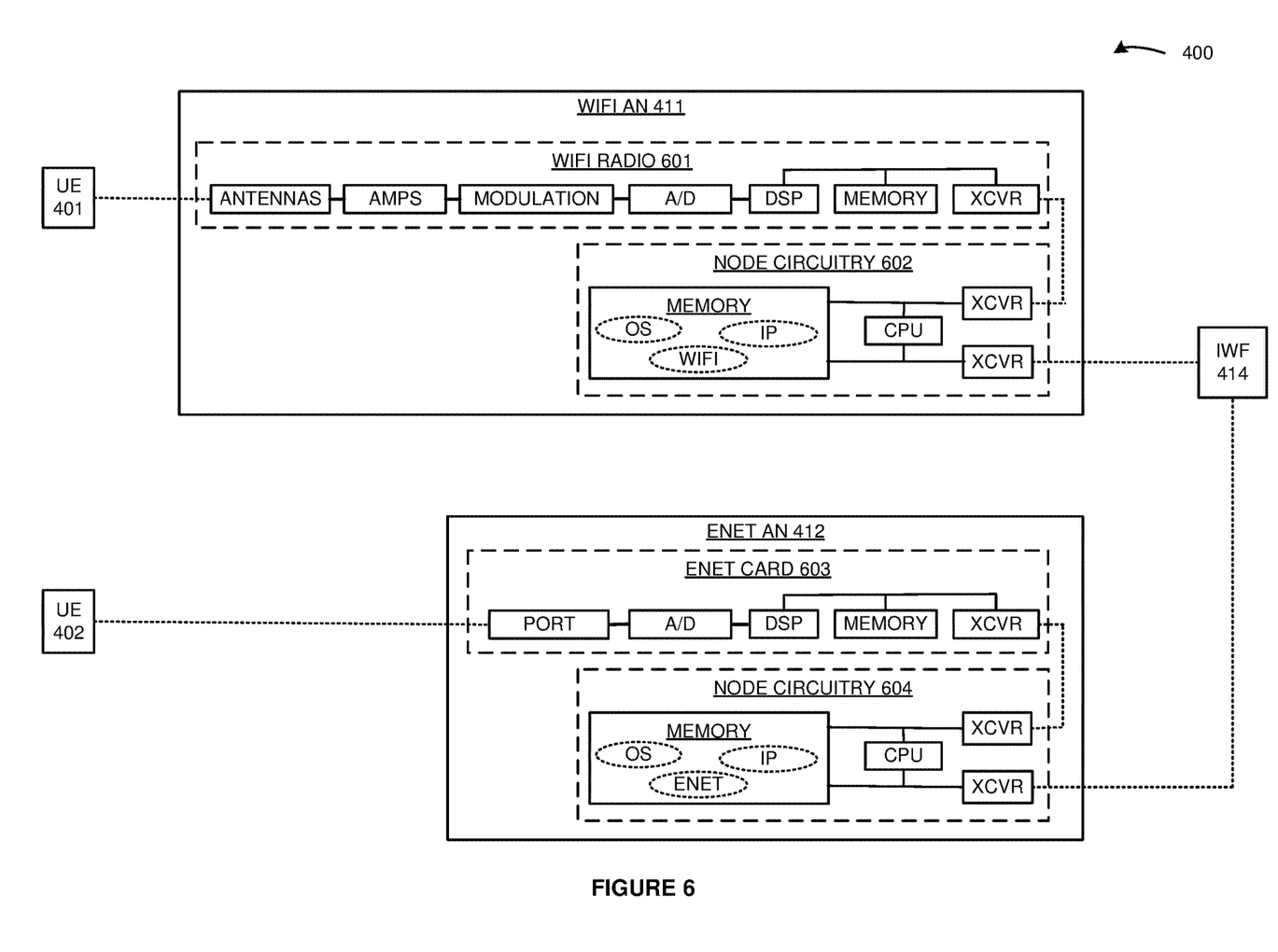
FIG. 6 illustrates exemplary non-3GPP access nodes in the 5G wireless communication network.

FIG. 6 illustrates non-3GPP ANs 411-412 in 5G wireless communication network 400. Non-3GPP access nodes 411-412 comprise alternative examples to access node 111. WIFI AN 411 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system and network applications for IP and WIFI. The antennas in WIFI radio 601 are wirelessly coupled to UE 401 over a WIFI link. Transceivers in WIFI radio 601 are coupled to transceivers in node circuitry 602. Transceivers in node circuitry 602 are coupled to transceivers in IWF 414. The CPU in node circuitry 602 executes the operating systems and network applications to exchange network signaling and slice data with UE 401 and with IWF 414.

ENET AN 412 comprises ENET card 603 and node circuitry 604. ENET card 603 comprises ports, analog-to-digital interfaces, DSP, memory, and transceivers that are coupled over bus circuitry. Node circuitry 604 comprises memory, CPU, user interfaces and components, and transceivers that are coupled over bus circuitry. The memory in node circuitry 604 stores an operating system and network applications for IP and ENET. The ports in ENET card 603 are wireline coupled to UE 402 over an ENET link. Transceivers in ENET card 603 are coupled to transceivers in node circuitry 604. Transceivers in node circuitry 604 are coupled to transceivers in IWF 414. The CPU in node circuitry 604 executes the operating systems and network applications to exchange network signaling and slice data with UE 402 and with IWF 414.

Figure 7:
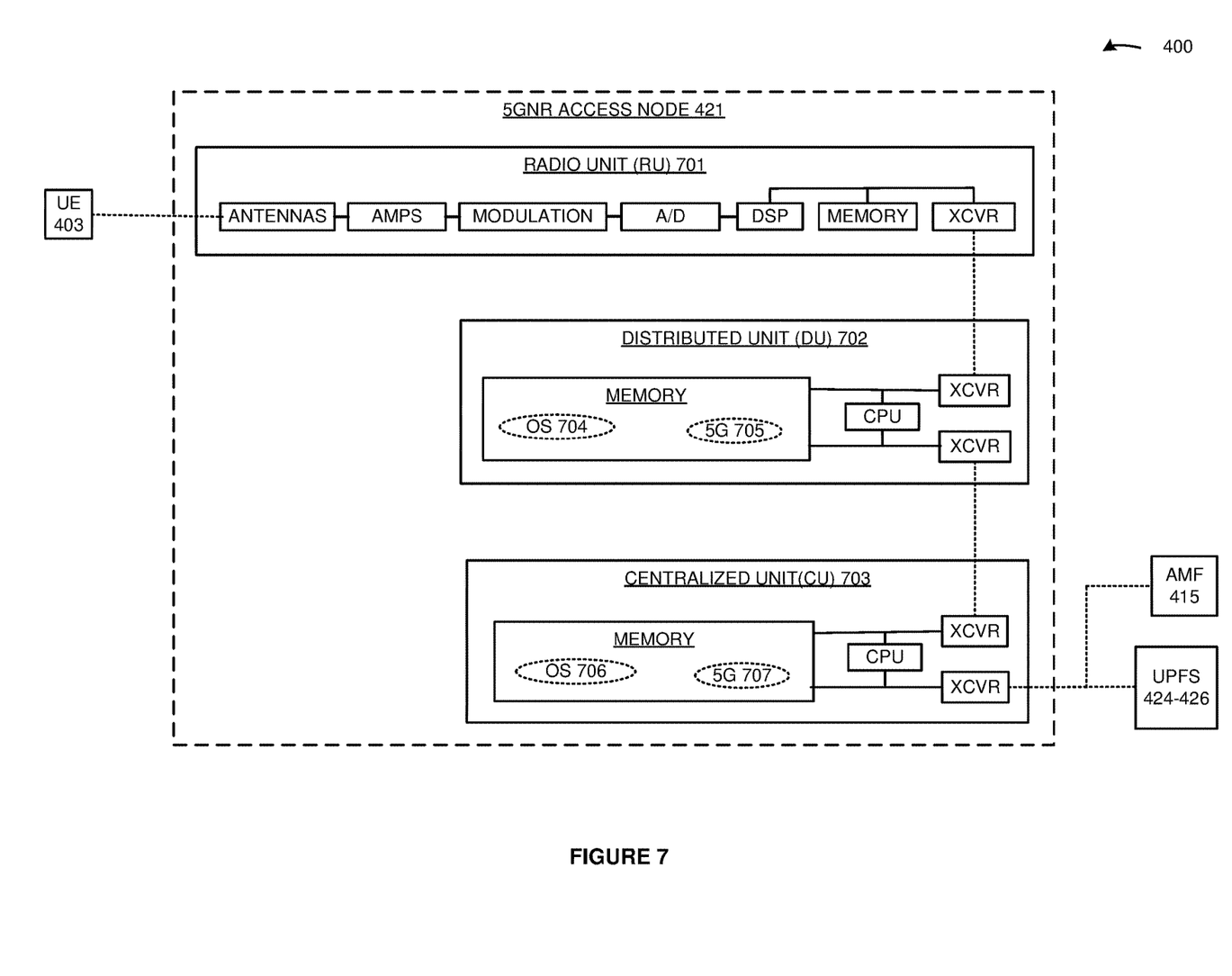
FIG. 7 illustrates an exemplary 5G New Radio (5GNR) access node in the 5G wireless communication network.

FIG. 7 illustrates 5G New Radio (5GNR) access node 413 in 5G wireless communication network 400. 5GNR access node 413 comprise an example of access node 111, although node 111 may differ. 5GNR access node 413 comprises Radio Unit (RU) 701, Distributed Unit (DU) 702, and Centralized Unit (CU) 703. RU 701 comprises 5GNR antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system 704 and 5G applications 705 (PHY, MAC, RLC). CU 703 comprises memory, CPU, user interfaces and components, and transceivers that are coupled over bus circuitry. The memory in CU 703 stores operating system 706 and 5G applications 707 (PDCP, SDAP, RRC). The antennas in RU 701 are wirelessly coupled to UE 403 over 5GNR links. Transceivers in RU 701 are coupled to transceivers in DU 702. Transceivers in DU 702 are coupled to transceivers in CU 703. Transceivers in CU 703 are coupled to AMF 415 and UPFs 424-426. The DSP and CPU in RU 701, DU 702, and CU 703 execute the radio applications, operating system 704, 5G applications 705, operating system 706, and 5G applications 707 to exchange network signaling with UE 403 and AMF 415. The DSP and CPU in RU 701, DU 702, and CU 703 execute the radio applications, operating system 704, 5G applications 705, operating system 706, and 5G applications 707 to exchange slice data between UE 403 and UPFs 424-426.

Figure 8:
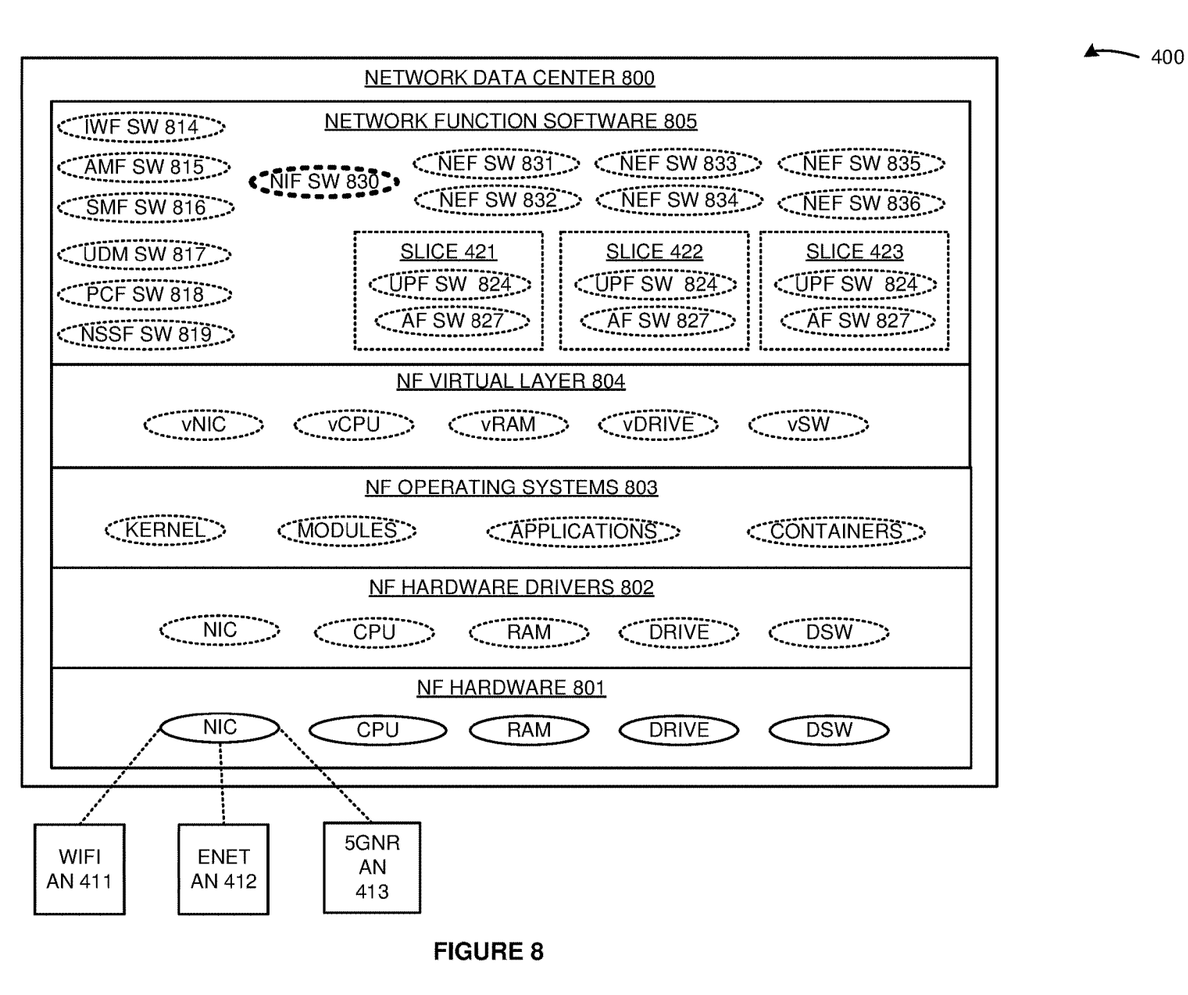
FIG. 8 illustrates an exemplary network data center in the 5G wireless communication network.

FIG. 8 illustrates network data center 800 in 5G wireless communication network 400. Network data center 800 comprises an example of network functions 112, NIF 113, and NEFs 114-116, although functions 112-116 may differ. Network data center 800 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SW 814, AMF SW 815, SMF SW 816, UDM SW 817, PCF SW 818, NSSF SW 819, slices 421-423, NIF SW 830, and NEF SW 831-836. Slice 421 comprises UPF SW 824 and AF SW 827. Slice 422 comprises UPF SW 825 and AF SW 828. Slice 423 comprises UPF SW 826 and AF SW 829. Other NFs like Authentication Server Function (AUSF) and Network Repository Function (NRF) are typically present but are omitted for clarity. Network data center 800 may be located at a single site or be distributed across multiple geographic locations. The NIC in NF hardware 801 are coupled to WIFI AN 411, ENET AN 412, and 5GNR AN 413. NF hardware 801 executes NF hardware drivers 802, NF operating systems 803, NF virtual layer 804, and NFs 805 to form and operate IWF 414, AMF 415, SMF 416, UDM 417, PCF 418, NSSF 419, slices 421-423, NIF 430, and NEFs 431-436.

Figure 9:
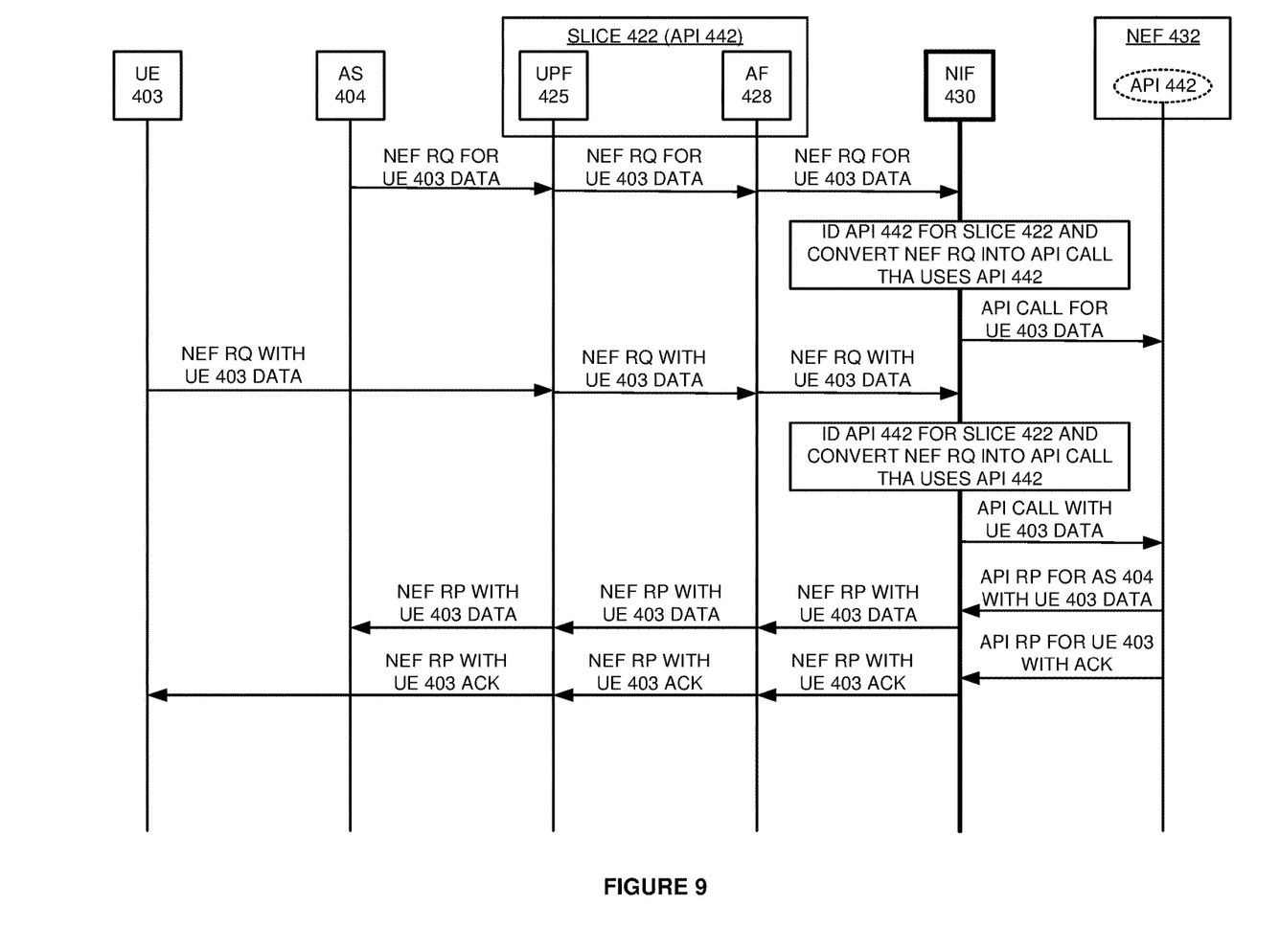
FIG. 9 illustrates an exemplary operation of the 5G wireless communication network to serve UEs over NEFs that have APIs.

FIG. 9 illustrates an exemplary operation of 5G wireless communication network 400 to serve UEs 401-403 over NEFs 431-436 that have APIs 441-446. The operation may differ in other examples. AS 404 transfers a NEF request to AF 428 in slice 422 over ENET AN 412, IWF 414, and UPF 425. The NEF request comprises a subscription to UE 403 data. Using a data structure, NIF 430 translates the ID for slice 422 into an ID for API 442 and translates the ID for API 442 into an ID for NEF 432. NIF 430 converts the NEF request into an API call using API 442. NIF 430 transfers the API call to selected NEF 432. NEF 432 process the API call using API 442 to initiate the AS 404 subscription for UE 403 data. In a similar manner, AS 404-406 and NEFs 431-436 may perform NEF operations like UE monitoring, device triggering, background data transfer, parameter provisioning, packet flow description management, traffic influence, chargeable party control, and NEF session quality.

UE 403 transfers another NEF request to AF 428 in slice 422 over 5GNR AN 413 and UPF 425. The NEF request comprises UE 403 data. Using a data structure, NIF 430 translates the ID for slice 422 into the ID for API 442 and translates the ID for API 442 into the ID for NEF 432. NIF 430 converts the NEF request into an API call using API 442. NIF 430 transfers the API call to selected NEF 432.

NEF 432 process the API call using API 442 to serve the AS 404 subscription to UE 403 data. NEF 432 generates an API response for AS 404 using API 442 and transfers the API response to NIF 430. NIF 430 converts the API response into a NEF response using API 442. NIF 430 transfers the NEF response to AS 404 over AF 428 and UPF 425 in slice 422 and over IWF 414 and ENET AN 412. AS 404 receives the UE 403 data per the subscription.

NEF 432 generates another API response (an ack) for UE 403 using API 442 and transfers the API response to NIF 430. NIF 430 converts the API response into a NEF response using API 442. NIF 430 transfers the NEF response to UE 403 over AF 428 and UPF 425 in slice 422 and over 5GNR AN 413. UE 403 receives the ack to its NEF request having the UE data.

Figure 10:
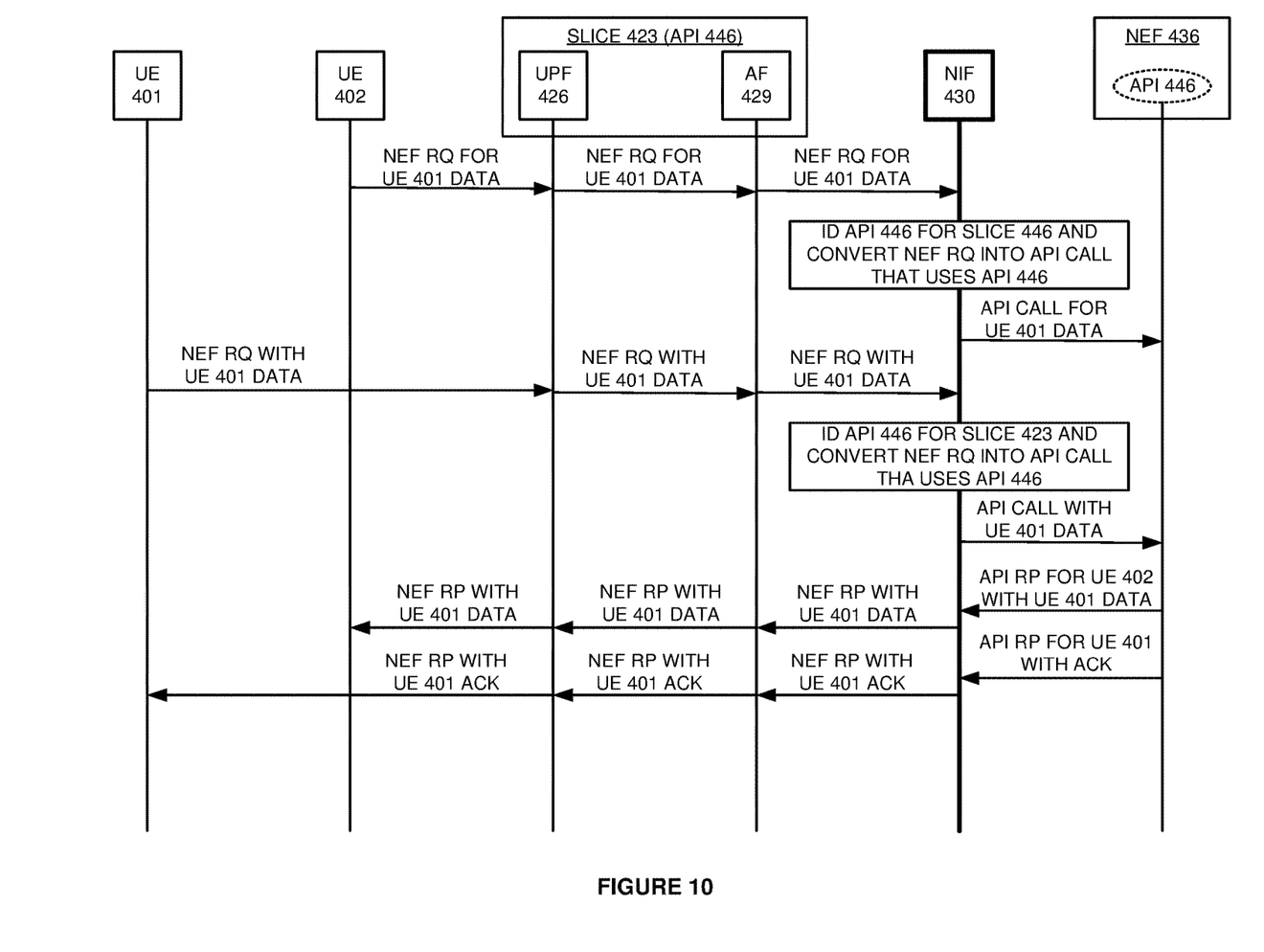
FIG. 10 illustrates an exemplary operation of the 5G wireless communication network to serve UEs over NEFs that have APIs.

FIG. 10 illustrates an exemplary operation of 5G wireless communication network 400 to serve UEs 401-403 over NEFs 431-436 that have APIs 441-446. The operation may differ in other examples. UE 402 transfers a NEF request to AF 429 in slice 423 over ENET AN 412, IWF 414, and UPF 426. The NEF request comprises a subscription to UE 401 data. Using a data structure, NIF 430 translates the ID for slice 423 into an ID for API 446 and translates the ID for API 446 into an ID for NEF 436. NIF 430 converts the NEF request into an API call using API 446. NIF 430 transfers the API call to selected NEF 436. NEF 436 process the API call using API 446 to log the UE 402 subscription for UE 401 data. In a similar manner, UEs 401-403 and NEFs 431-436 may perform NEF operations like UE monitoring, device triggering, background data transfer, parameter provisioning, packet flow description management, traffic influence, chargeable party control, and NEF session quality.

UE 401 transfers another NEF request to AF 429 in slice 423 over WIFI AN 411, IWF 414, and UPF 426. The NEF request comprises UE 401 data. Using a data structure, NIF 430 translates the ID for slice 423 into the ID for API 446 and translates the ID for API 446 into the ID for NEF 436. NIF 430 converts the NEF request into an API call using API 446. NIF 430 transfers the API call to selected NEF 436.

NEF 436 process the API call using API 446 to serve the UE 402 subscription to UE 401 data. NEF 436 generates an API response for UE 402 using API 446 and transfers the API response to NIF 430. NIF 430 converts the API response into a NEF response using API 446. NIF 430 transfers the NEF response to UE 402 over AF 429 and UPF 426 in slice 422 and over IWF 414 and WIFI AN 411. UE 402 receives the UE 401 data per the subscription.

NEF 436 generates another API response (an ack) for UE 401 using API 446 and transfers the API response to NIF 430. NIF 430 converts the API response into a NEF response using API 446. NIF 430 transfers the NEF response to UE 401 over AF 429 and UPF 426 in slice 423 and over IWF 414 and WIFI AN 411. UE 401 receives the ack to its NEF request having the UE data.

The wireless data network circuitry described above comprises computer hardware and software that form special-purpose networking circuitry to serve UEs over NEFs that have APIs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over NEFs that have APIs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) over Network Exposure Functions (NEFs) that have Application Programming Interfaces (APIs), the method comprising:
   receiving, by a NEF Interface Function (NIF), a NEF request from a network function;
   correlating, by the NIF, a slice Identifier (ID) for the UE in the NEF request with one of the APIs;
   selecting, by the NIF, one of the NEFs based on the one of the APIs;
   translating, by the NIF, the NEF request into an API call based on the one of the APIs;
   transferring, by the NIF, the API call to the one of the NEFs; and
   receiving, by the one of the NEFs, the API call and responsively performing a network task for the UE based on the API call.

2. The method of claim 1 wherein correlating, by the NIF, the NEF request with the one of the APIs comprises correlating a UE ID for the UE in the NEF request with the one of the APIs.

3. The method of claim 1 wherein selecting, by the NIF, one of the NEFs based on the one of the APIs comprises selecting one of the NEFs based on a geographic location of the UE and the one of the APIs.

4. The method of claim 1 wherein the network function comprises an Application Function (AF) and further comprising receiving, by the AF, UE data from the UE and responsively generating the NEF message for the NIF.

5. The method of claim 1 wherein the network function comprises an Application Function (AF) and further comprising receiving, by the AF, UE data from an Application Server (AS) and responsively generating the NEF message for the NIF.

6. The method of claim 1 wherein:
   performing, by the one of the NEFs, the corresponding task for the UE based on the API call comprises generating and transferring, by the one of the NEFs, an API response to the API call to the NIF; and further comprising:
   receiving, by the NIF, the API response and translating the API response into a NEF response based on the one of the APIs; and
   transferring, by the NIF, the API response to another network function.

7. The method of claim 1 wherein:
   performing, by the one of the NEFs, the corresponding task for the UE based on the API call comprises generating and transferring, the one of the NEFs, an API response to the API call to the NIF; and further comprising:
   receiving, by the NIF, the API response and translating the API response into a NEF response based on the one of the APIs; and
   transferring, by the NIF, the API response to the UE.

8. The method of claim 1 wherein:
   performing, by the one of the NEFs, the corresponding task for the UE based on the API call comprises generating and transferring, by the one of the NEFs, an API response to the API call to the NIF; and further comprising:
   receiving, by the network function, UE data from the UE and responsively generating the NEF message for the NIF;
   receiving, by the NIF, the API response and translating the API response into a NEF response based on the one of the APIs; and
   transferring, by the NIF, the API response to an Application Function (AF).

9. The method of claim 1 wherein:
   performing, by the one of the NEFs, the corresponding task for the UE based on the API call comprises generating and transferring, by the one of the NEFs, an API response to the API call to the NIF; and further comprising:
   receiving, by the network function, UE data from the UE and responsively generating the NEF message for the NIF;
   receiving, by the NIF, the API response and translating the API response into a NEF response based on the one of the APIs; and
   transferring, by the NIF, the API response to the network function; and transferring, by the network function, the API response to the UE.

10. The method of claim 1 wherein:
performing, by the one of the NEFs, the corresponding task for the UE based on the API call comprises generating and transferring, by the one of the NEFs, an API response to the API call to the NIF; and further comprising:
receiving, by the network function, UE data from the UE and responsively generating the NEF message for the NIF;
receiving, by the NIF, the API response and translating the API response into a NEF response based on the one of the APIs; and
transferring, by the NIF, the API response to the network function; and
transferring, by the network function, the API response to another UE.

11. A wireless communication network to serve a User Equipment (UE) over Network Exposure Functions (NEFs) that have Application Programming Interfaces (APIs), the wireless communication network comprising:
NEF Interface Function (NIF) circuitry that:
receives a NEF request from a network function;
correlates a slice Identifier (ID) for the UE in the NEF request with one of the APIs;
selects one of the NEFs based on the one of the APIs;
translates the NEF request into an API call based on the one of the APIs;
transfers the API call to the one of the NEFs; and
the one of the NEFs that:
receives the API call and responsively performs a network task for the UE based on the API call.

12. The wireless communication network of claim 11 wherein the NIF circuitry further correlates a UE ID for the UE in the NEF request with the one of the APIs.

13. The wireless communication network of claim 11 wherein the NIF circuitry further selects one of the NEFs based on a geographic location of the UE and the one of the APIs.

14. The wireless communication network of claim 11 wherein the network function comprises an Application Function (AF) that receives UE data from the UE and responsively generates the NEF message for the NIF circuitry.

15. The wireless communication network of claim 11 wherein the network function comprises an Application Function (AF) that receives UE data from an Application Server (AS) and responsively generates the NEF message for the NIF circuitry.

16. The wireless communication network of claim 11 wherein:
the one of the NEFs generates and transfers an API response to the API call to the NIF circuitry; and
wherein the NIF circuitry further:
receives the API response and translates the API response into a NEF response based on the one of the APIs; and
transfers the API response to another network function.

17. The wireless communication network of claim 11 wherein:
the one of the NEFs generates and transfers an API response to the API call to the NIF circuitry; and
wherein the NIF circuitry further:
receives the API response and translates the API response into a NEF response based on the one of the APIs; and
transfers the API response to the UE.

18. The wireless communication network of claim 11 wherein:
the one of the NEFs generates and transfers an API response to the API call to the NIF circuitry; and
wherein:
the network function further:
receives UE data from the UE and responsively generates the NEF message for the NIF circuitry; and
the NIF circuitry further:
receives the API response and translates the API response into a NEF response based on the one of the APIs; and
transfers the API response to an Application Function (AF).

19. The wireless communication network of claim 11 wherein:
the one of the NEFs generates and transfers an API response to the API call to the NIF circuitry; and
wherein:
the network function:
receives UE data from the UE and responsively generates the NEF message for the NIF circuitry; and
transfers the API response to the UE; and
the NIF circuitry further:
receives the API response and translates the API response into a NEF response based on the one of the APIs; and
transfers the API response to the network function.

20. The wireless communication network of claim 11 wherein:
the one of the NEFs generates and transfers an API response to the API call to the NIF circuitry; and
wherein:
the network function further:
receives UE data from the UE and responsively generate the NEF message for the NIF circuitry; and
transfers the API response to another UE; and
the NIF circuitry further:
receives the API response and translates the API response into a NEF response based on the one of the APIs;
transfers the API response to the network function.

* * * * *